(12) United States Patent
Gohel

(10) Patent No.: US 6,894,505 B2
(45) Date of Patent: May 17, 2005

(54) FLEXIBLE INTERFACE FOR UNIVERSAL BUS TEST INSTRUMENT

(75) Inventor: Tushar K. Gohel, Malden, MA (US)

(73) Assignee: Teradyne, Inc., Boston, MA (US)

( * ) Notice: Subject to any disclaimer, the term of this patent is extended or adjusted under 35 U.S.C. 154(b) by 12 days.

(21) Appl. No.: 10/317,310

(22) Filed: Dec. 12, 2002

(65) Prior Publication Data

US 2004/0056666 A1 Mar. 25, 2004

Related U.S. Application Data

(60) Provisional application No. 60/400,444, filed on Aug. 1, 2002.

(51) Int. Cl.$^7$ ............................ G01R 31/02; G06F 13/14
(52) U.S. Cl. ........................................ 324/539; 710/305
(58) Field of Search .............................. 324/539, 538, 324/73.1, 523, 527, 763; 710/305, 104, 106, 313

(56) References Cited

U.S. PATENT DOCUMENTS

| | | | |
|---|---|---|---|
| 5,333,194 A | * | 7/1994 | Caesar ........................ 379/402 |
| 5,929,655 A | | 7/1999 | Roe et al. ...................... 326/82 |
| 6,243,776 B1 | * | 6/2001 | Lattimore et al. .......... 710/104 |
| 2001/0013770 A1 | * | 8/2001 | Wohlfarth ................... 324/73.1 |
| 2002/0087924 A1 | | 7/2002 | Panis et al. .................. 714/712 |

* cited by examiner

Primary Examiner—N. Le
Assistant Examiner—Amy He
(74) Attorney, Agent, or Firm—Teradyne Legal Department

(57) ABSTRACT

An interface for a bus test instrument is readily adaptable for testing a wide range of bus types. The interface includes a pair of transmit lines and a pair of receive lines. A transmitting circuit is adaptable for transmitting either single-ended or differential signals over the transmit lines, and at least one receiving circuit is adaptable for receiving either single-ended or differential signals from either the receive lines or the transmit lines. The flexible interface allows the testing of single-ended and differential busses, as well as busses that support both unidirectional and bidirectional communication.

23 Claims, 4 Drawing Sheets

FLEXIBLE INTERFACE FOR UNIVERSAL BUS TEST INSTRUMENT

CROSS-REFERENCES TO RELATED APPLICATIONS

The application claims priority from provisional application 60/400,444, filed Aug. 1, 2002.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of the Invention

This invention relates generally to equipment for testing electronic devices and busses, and, more particularly, to test equipment that is adaptable for testing devices and digital busses covering a wide range of bus interface specifications.

2. Description of Related Art

The military and the commercial sector commonly employ digital busses for controlling electronic systems. Different types of busses are used in different applications. For instance, commercial aircraft commonly use ARINC 429 busses for avionics systems, while the military commonly uses MIL-STD-1553 busses for controlling aircraft and weapons systems. The commercial sector commonly uses RS-232 busses for computer applications. In addition, military and commercial entities often develop custom busses, with proprietary interface specifications and protocols, for enabling communication among different elements of in-house systems.

Manufacturers of devices for digital busses often use automatic test equipment (ATE) to verify device performance. Customarily, this test equipment is designed specifically for a particular bus type. For instance, specialized ARINC 429 instruments are employed for testing ARINC 429 devices, whereas specialized MIL-STD-1553 instruments are used for testing 1553 devices. Manufacturers of proprietary busses often develop custom test equipment for testing their custom bus devices. Alternatively, they may adapt general-purpose digital test equipment to suit their particular testing needs.

The specialization in bus test equipment is attributable in part to the fact that interface specifications for different bus types vary widely. Different busses can operate at different frequencies, edge speeds, and/or voltage levels. Busses can be unidirectional or bidirectional, single-ended or differential. Some busses provide handshaking and/or clock lines; some do not.

Despite these differences, we have recognized that the testing problems posed by digital busses are essentially similar across different types of busses, and that manufacturers could benefit from a more universal approach to bus testing.

BRIEF SUMMARY OF THE INVENTION

With the foregoing background in mind, it is an object of the invention for a hardware interface to be readily adaptable for testing different types of digital bus devices.

To achieve the foregoing object, as well as other objectives and advantages, a flexible interface for testing devices for digital busses includes transmit lines and receive lines. A transmitting circuit is adaptable for transmitting both single-ended and differential signals over the transmit lines, and at least one receiving circuit is adaptable for receiving both single-ended and differential signals. The interface supports both unidirectional and bidirectional communication.

BRIEF DESCRIPTION OF THE DRAWINGS

Additional objects, advantages, and novel features of the invention will become apparent from a consideration of the ensuing description and drawings, in which—

DETAILED DESCRIPTION OF THE PREFERRED EMBODIMENT

Figure 1:
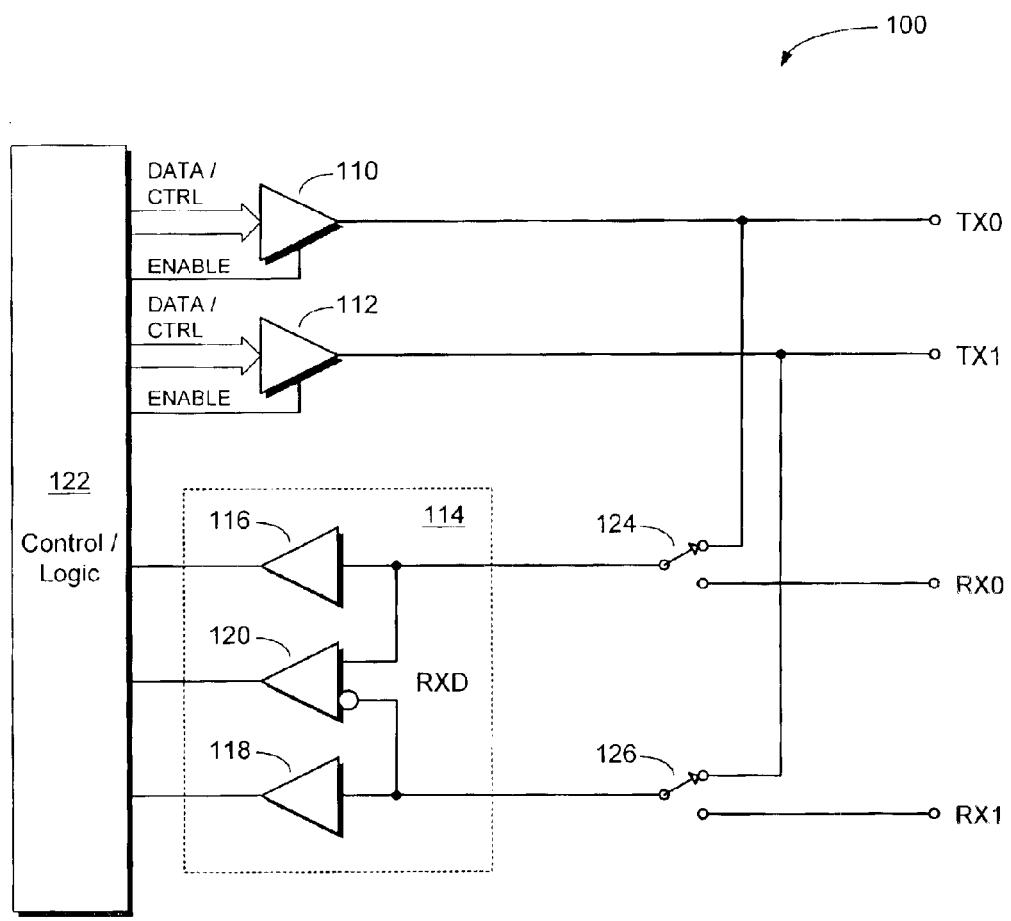
FIG. 1 is a simplified schematic of a flexible interface circuit for testing a wide range of digital busses and devices according to the invention.

FIG. 1 shows a first illustrative embodiment 100 of a flexible interface for testing digital busses according to the invention. The interface has first and second transmit lines, TX0 and TX1, and first and second receive lines, RX0 and RX1, for communicating with a device under test (DUT). First and second transmitters 110 and 112 respectively provide output signals to TX0 and TX1. A receiver circuit 114 includes first and second single-ended receivers 116 and 118 and a differential receiver 120. The single-ended receivers 116 and 118 each have an input, and the inputs are connectable, preferably as a pair, either to TX0 and TX1, or to RX0 and RX1, respectively. The differential receiver 120 has first and second inputs respectively coupled to the inputs of the first and second single-ended receivers 116 and 118, and generates an output signal proportional to the differential voltage between these inputs. The transmitters and receivers are configured via a control/logic section 122, which also receives the outputs of the receivers 116, 118, and 120.

Figure 2:
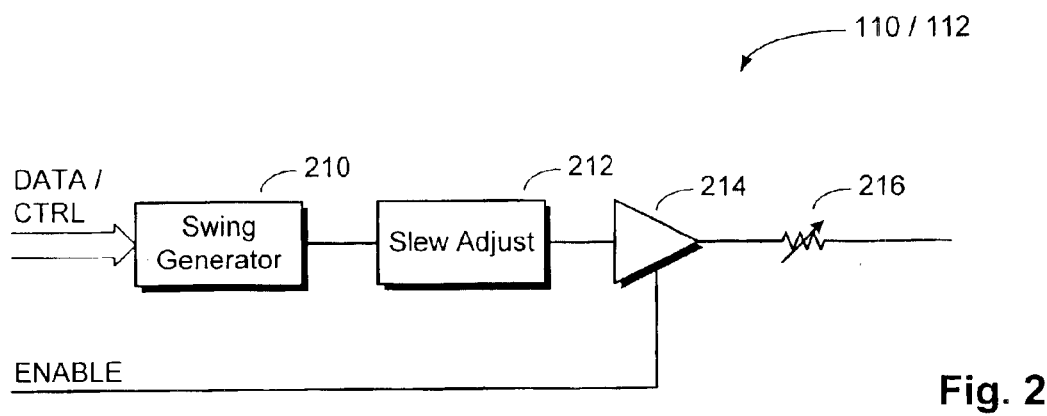
FIG. 2 is a more detailed schematic of a transmit circuit shown in FIG. 1.

FIG. 2 shows a more detailed view of one of the transmitters 110/112. Each transmitter preferably includes a swing generator 210, such as a digital-to-analog converter (DAC), which receives data indicative of a desired transmitter output voltage. The swing generator 210 may also be implemented by switching reference voltages using bus switches or similar devices. Preferably, the swing generator can produce at least three different voltage levels, although this is not required. The output of the swing generator 210 is coupled to a slew rate adjusting circuit 212, and the output of the slew rate adjusting circuit is coupled to a low gain driver 214. The low gain driver 214 is preferably tri-statable (i.e., its output can be placed in a high impedance state), under the control of a control signal (ENABLE). An example of a suitable driver is disclosed in U.S. patent application Ser. No. 10/113,179, entitled "DRIVER CIRCUIT EMPLOYING HIGH-SPEED TRI-STATE FOR AUTOMATIC TEST EQUIPMENT," which is hereby incorporated by reference in its entirety. An impedance 216 is preferably coupled in series with the output of the driver 214 for providing a series termination. In the preferred embodiment, the impedance 216 is selectable with values of 3-ohms, 50-ohms, 75-ohms, and 100-ohms. Other impedances can be used; however, the above values are believed to accommodate the requirements of most digital busses.

To operate a transmitter (110 or 112), the swing generator 210 is programmed with a new value that produces an output step having high slew rate. The slew rate adjust circuit 212 slows the slew rate (preferably programmably) to produce an output signal having a desired slew rate. The low gain driver 214 preferably provides both voltage and current gain and drives the boosted signal via the selectable impedance 216.

Figure 3:
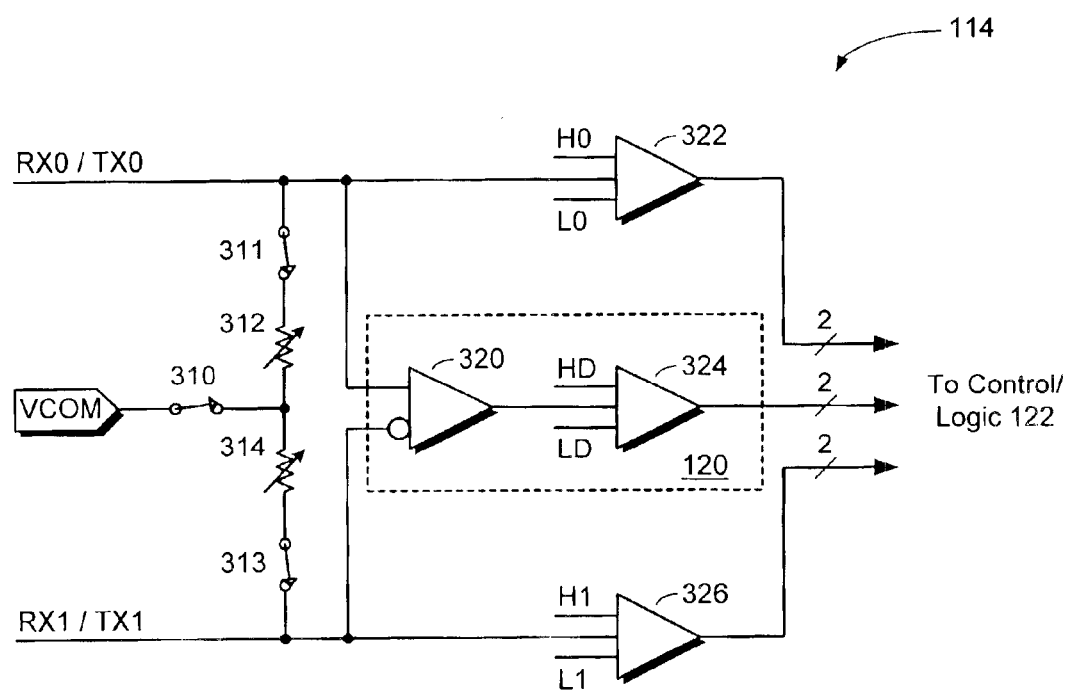
FIG. 3 is a more detailed schematic of a receive circuit as shown in FIG. 1.

FIG. 3 shows a more detailed view of the receiver 114 of FIG. 1. Lines RX0/TX0 and RX1/TX1 are respectively coupled to inputs of single-ended comparators 322 and 326. These comparators 322 and 326 are preferably window comparators, i.e., they compare their inputs with first and second reference values (H0, L0 and H1, L1) to generate 2-bit output signals indicative of the relative levels of the input signals and the references. Lines RX0/TX0 and RX1/TX1 are also coupled to inputs of the differential comparator 120. The differential comparator includes an analog differential amplifier 320 and a third comparator 324. The amplifier preferably has a low gain and produces an output signal proportional to a difference between the signal levels at is inputs. The third comparator 324 is preferably also a window comparator, which produces a 2-bit output indicative of the relative level of its input and its references, HD and LD. The differential amplifier thus allows the voltage difference between its input signals to be compared with threshold levels, independently of the common-mode voltage of its input signals.

The outputs of the window comparators 322, 324, and 326 are preferably provided to the control/logic section 122. The control/logic section preferably includes digital sampling circuitry for sampling the outputs of comparators 322, 324, and 326 at predetermined instants in time, and circuitry for storing and reporting results. Although the comparators 322, 324, and 326 are preferably window comparators, other types of comparators can alternatively be used, for providing any number of bits of output data indicative of the respective input voltages.

The receiver 114 preferably also includes termination impedances, such as impedances 312 and 314. These impedances are preferably connectable via switches 311 and 313, respectively, and are selectable with values of 25-ohms, 37.5-ohms, 50-ohms, 75-ohms, and 100-ohms, for accommodating a wide range of bus types. In the preferred embodiment, a switch 310 selectively connects a programmable reference level, VCOM, to a node at the junction of the impedances 312 and 314. When the switch 310 is open, the inputs to the receiver 114 are terminated with respect to each other. When the switch 310 is closed, the inputs are each individually terminated to VCOM. Where less flexibility is required, such as for receiving handshaking signals, a simple resistive load could be supplied for terminating signals relative to VCOM, ground, or some other DC voltage.

Figure 4:
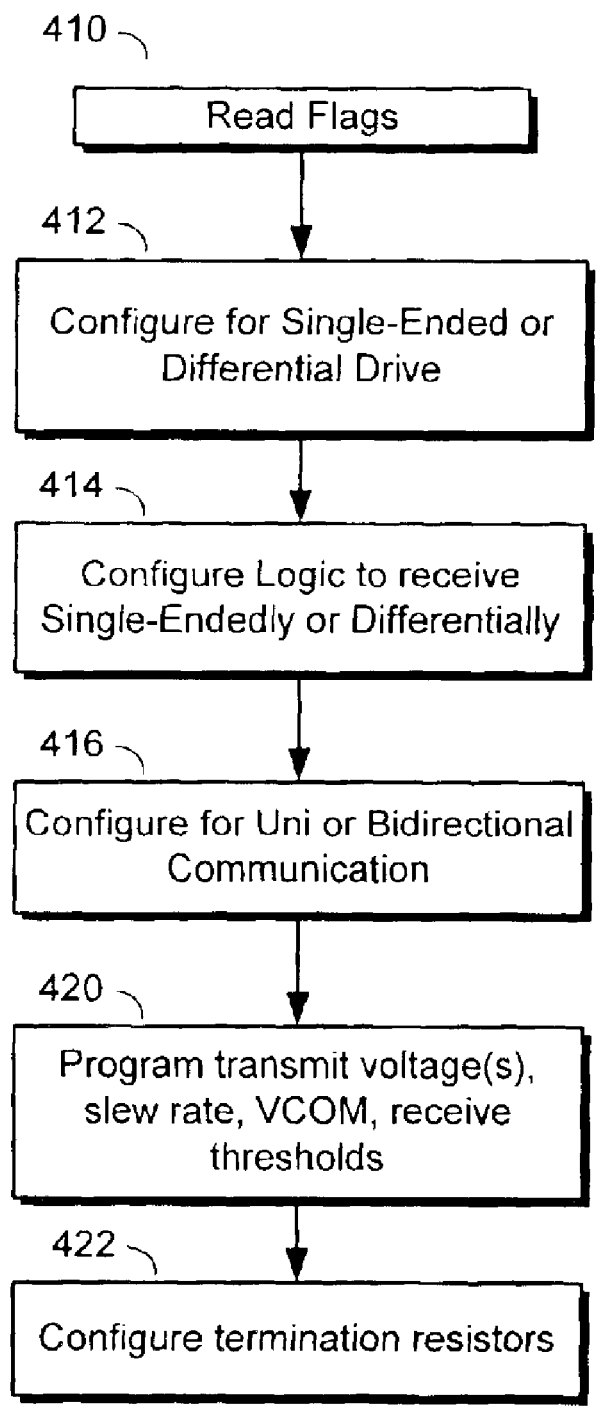
FIG. 4 is a flowchart showing a process for operating the flexible interface of FIG. 1.

FIG. 4 shows a process employed by the control/logic section 122 for configuring the flexible interface 100 to suit the requirements of any of a wide range of bus types. Although the steps shown in FIG. 4 appear in a particular sequence, it should be understood that the order of the steps is not critical and can be varied within the scope of the invention. For instance, the steps can be executed in a different order, and some or all of the steps may be executed simultaneously.

At step 410, the control/logic section 122 reads a series of flags. The flags indicate the signals from a DUT that support single-ended communication and those that support differential communication. The flags also indicate the signals that support unidirectional communication and those that support bidirectional communication. For differential signals, the control/logic section 122 configures single-ended transmitters for driving differential signals (step 412). This step generally entails preparing to program the swing generators 210 associated with the two transmitters 110 and 112 so that they vary in opposition with each other, i.e., to values that change with a 180-degree phase relationship. At step 414, the control/logic section prepares to respond to the output of the differential comparator 120 (step 416), rather than to the outputs of the single-ended comparators 116 and 118, closes switches 111 and 113, and opens the switch 310, for terminating the receive lines to each other. For signals that support single-ended communication, the transmitter(s) are configured for single-ended drive and/or the receiver(s) are set for single-ended receive. The switch 310 is closed, to terminate the receive lines to VCOM. Switches 111 and 113 can be left open if no termination is desired.

For bus signals that support bidirectional communication (step 416), the control/logic section 122 configures the interface 100 for bidirectional communication (step 416). In the embodiment 100, this involves configuring one or both switches 124 and 126 to couple the inputs of the receiver 114 to the transmit lines, TX0 and TX1. Operation requires that one input be coupled to a transmit line for single-ended communication, but that both inputs be coupled to the transmit lines for differential communication.

If the signal supports unidirectional communication, the control/logic section 122 configures the interface 100 for unidirectional communication. In the embodiment 100, this involves configuring one or both switches 124 and 126 to couple the inputs of the receiver 114 to the receive lines, RX0 and RX1. Operation requires that one input be coupled to a receive line for single-ended communication, but that both inputs be coupled to the receive lines for differential communication.

At step 420, the voltages for the swing generators 210 are programmed, as well as the transmit slew rate, VCOM (if necessary), and the threshold values for the receivers 114. Termination impedances are selected (step 422) for both transmitters and receivers.

As is known, digital busses often require control lines, such as handshaking lines, clock lines, and the like, in addition to data lines. The interface 100 can preferably accommodate these special purpose signals. Data and/or control lines can be sent to a DUT via TX0 and/or TX1, and can be received from the DUT via RX0 and/or RX1. For bidirectional busses, data and/or control lines can be transmitted and received via TX0 and/or TX1.

In the preferred embodiment, the flexible interface forms part of a signal interface for a bus test instrument, which is adaptable for testing a wide variety of bus types and digital signals. The bus test instrument is preferably a module that plugs into a card cage, such as a VXI card cage, of an automatic test system. The bus test instrument is controllable via software, such as test programs that run on a host computer. The flexible interface is not limited to use with an instrument in a test system, however. It can also be used in other test circuits or other circuits that interface with one or more types of busses or digital signals.

The preferred embodiment of the invention primarily focuses on testing serial busses. Multiple copies of the interface 100 are preferably used for accommodating the numerous signals that different serial busses may require. Some serial busses require multiple bits of data, and some require multiple control lines. We have discovered that three copies of the interface 100 are generally adequate for testing most types of serial devices. These different copies can be operated together, for testing busses that require greater than two transmit lines and/or greater than two receive lines. In the preferred embodiment, four different groups of three interfaces each are provided for testing multiple devices.

The I/O for each group of interface circuits is preferably provided on a single I/O connector for facilitating connection to a single bus device. In the preferred embodiment, each group of three interfaces 100 is provided on a single 26-pin D-Sub connector, and the bus test instrument includes four such connectors at its front panel.

A benefit of the interface 100 is that it accommodates a wide range of busses while requiring little connector space. This makes more connector space available for other interfaces of the same type, or for other instruments in a test system. The interface also requires little circuit board space, which frees up space for providing other functionality.

Alternatives

Figure 5:
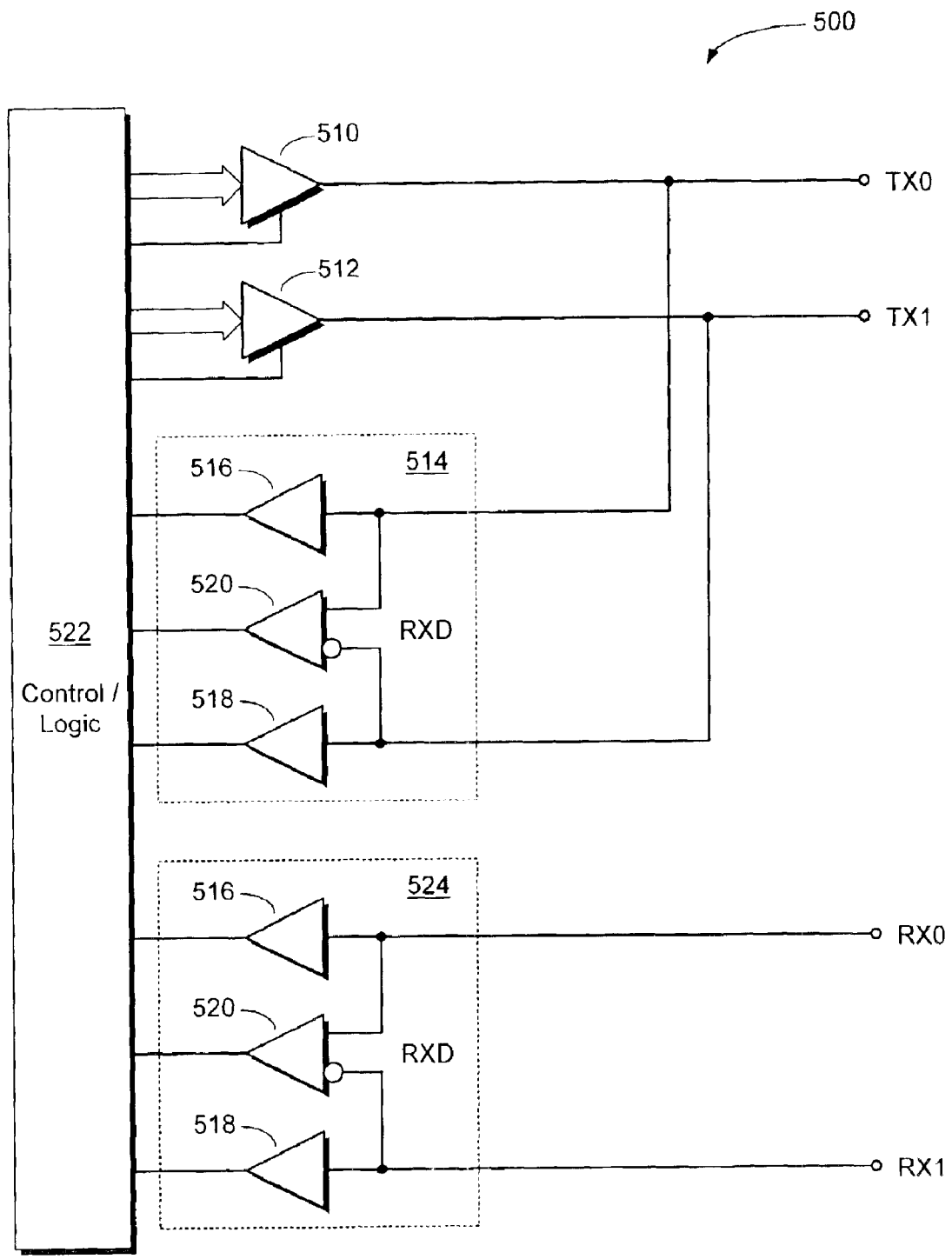
FIG. 5 is a simplified schematic of an alternative embodiment of the flexible interface circuit according to the invention.

Having described one embodiment, numerous alternative embodiments or variations can be made. FIG. 5 shows an alternative embodiment 500 of the flexible interface. The interface 500 has the same number of I/O connections as the interface 100. It differs, however, in that it provides two receiver circuits, one for bidirectional communication (514) and one for unidirectional communication (524). The embodiment 500 thus eliminates the switches 124 and 126 while preserving the functionality of the interface 100.

The three copies of the flexible interface (or however many are used per group) may be identical, but this is not required. For example, one or more copies may be dedicated to sending and/or receiving handshaking signals. This copy may include simpler circuitry with less flexibility than other copies, thereby enabling a cost savings without severely impacting effectiveness.

In addition, although the description provided herein refers primarily to serial bus applications (MIL-STD-1553, ARINC 429, RS-232), the flexible interface and methods described herein are also applicable for use with parallel busses or other digital signals. For use with parallel busses, greater than three copies of the flexible interface may be used to accommodate greater numbers of data bits simultaneously, and I/O connectors having greater numbers of terminals may be used.

While the invention has been particularly shown and described with reference to the preferred embodiments thereof, it will be understood by those skilled in the art that various changes in form and detail may be made therein without departing from the spirit and scope of the invention.

What is claimed is:

1. A flexible interface for use in testing a variety of different digital busses having different interface specifications, comprising:

first and second transmit nodes;

first and second receive nodes;

a controller adapted to control the transmit and receive signals to the digital bus;

a first transmitter responsive to the controller, the first transmitter having an output coupled to the first transmit node and adapted to transmit signals having programmable drive levels according to the interface specifications of the digital bus;

a second transmitter responsive to the controller, the second transmitter having an output coupled to the second transmit node and adapted to transmit signals having programmable drive levels according to the interface specifications of the digital bus;

a first single-ended receiver responsive to the controller, the first receiver having an input selectively connectable to one of the first receive node and the output of the first transmitter and adapted to receive signals and programmable thresholds according to the specifications of the digital bus;

a second single-ended receiver responsive to the controller, the second receiver having an input selectively connectable to one of the second receive node and the output of the second transmitter and adapted to receive signals and programmable thresholds according to the specifications of the digital bus; and a differential receiver responsive to the controller, the differential receiver having first and second inputs, the first input being coupled to the input of the first single-ended receiver and the second input being coupled to the input of the second single-ended receiver and adapted to receive signals and programmable thresholds according to the specifications of the digital bus.

2. A flexible interface as recited in claim 1, wherein the first single-ended receiver is connectable to one of the first receive node and the output of the first transmitter via a first switch, and the second single-ended receiver is connectable to one of the second receive node and the output of the second transmitter via a second switch.

3. A flexible interface as recited in claim 1, wherein the first and second transmitters are tri-statable.

4. A flexible interface for testing a device under test, the device under test including a digital bus, the flexible interface comprising:

first and second transmit nodes adapted for communicating with the device under test;

first and second receive nodes adapted for communicating with the device under test;

first and second single-ended drive circuits, each having an output, the outputs being respectively coupled to the first and second transmit nodes; and at least one receiver circuit having first and second inputs selectively coupled to at least one of the first and second transmit nodes and at least one of the first and second receive nodes, wherein the receiver circuit includes a first single-ended comparator having inputs coupled to the first input of the receiver circuit and one or more programmable thresholds, a second single-ended comparator having inputs coupled to the second input of the receiver circuit and one or more programmable thresholds, and a differential comparator having inputs coupled to a differential signal between the first and second receiver circuits and one or more programmable thresholds.

5. A flexible interface for testing devices for a variety of digital bus types, comprising:

first and second transmit nodes;

first and second receive nodes;

first and second single-ended drive circuits, each having an output, the outputs being respectively coupled to the first and second transmit nodes;

at least one receiver circuit having first and second inputs selectively coupled to at least one of the first and second transmit nodes and the first and second receive nodes;

wherein at least one receiver circuit includes a first single-ended comparator having an input coupled to the first input of the receiver circuit, a second single-ended comparator having an input coupled to the second input of the receiver circuit, and a differential comparator having a first input coupled to the first input of the receiver circuit and a second input coupled to the second input of the receiver circuit; and wherein each at least one receiver circuit comprises a selectable termination impedance that terminates the inputs of the at least one receiver circuit to an adjustable DC reference voltage.

6. A flexible interface for use in testing different digital busses, comprising:

a first node, second node, third node and fourth node all adapted for communicating with a device under test;

a first transmitter having an output coupled to the first node and adapted to drive the first node to at least two programmable drive levels;

a second transmitter having an output coupled to the second node and adapted to drive the second node to at least two programmable drive levels;

a first single-ended receiver having a first input selectively coupled to either the third node or the first node and adapted to compare the first input to one or more programmable thresholds;

a second single-ended receiver having a second input selectively coupled to either a fourth node or the second node and adapted to compare the second input to the programmable thresholds; and a differential receiver adapted to produce a differential signal from the first input and the second input and compare the differential signal to the programmable thresholds.

7. The flexible interface as recited in claim 6 wherein the first transmitter and the second transmitter are tri-statable.

8. The flexible interface as recited in claim 7 further comprising:

a first switch operatively coupled to the first single-ended receiver to selectively couple the first input to the third node or the first node; and a second switch operatively coupled to the second single-ended receiver to selectively couple the second input to the fourth node or the second node.

9. The flexible interface as recited in claim 6 wherein the first and second nodes comprise two independent unidirectional single-ended outputs and the third and fourth node comprise two independent unidirectional single-ended inputs.

10. The flexible interface as recited in claim 6 wherein the first and second nodes comprise two independent unidirectional single-ended outputs and the third and fourth node comprise one unidirectional differential input.

11. The flexible interface as recited in claim 6 wherein the first and second nodes comprise one unidirectional differential output and the third and fourth nodes comprise one unidirectional differential input.

12. The flexible interface as recited in claim 6 wherein the first and second nodes comprise one unidirectional differential output and the third and fourth nodes comprise two independent unidirectional single-ended inputs.

13. The flexible interface as recited in claim 6 wherein the first and second nodes comprise two single ended bi-directional inputs/outputs.

14. The flexible interface recited in claim 6 wherein the first and second nodes comprise a differential bi-directional input/output.

15. The flexible interface as recited in claim 6 further including a slew rate adjusting circuit operatively coupled to one or more of the single-ended transmitters.

16. The flexible interface as recited in claim 6 wherein one or more of the single-ended transmitters has selectable output impedance.

17. The flexible interface as recited in claim 6 wherein the single-ended transmitters further comprise:

a swing generator having an input for receiving input data and an output for establishing an output signal proportional to a desired output signal of the respective transmitter;

a slew rate adjusting circuit having an input and an output, the input being coupled to the output of the swing generator;

a tri-statable buffer having an input and an output, the input being coupled to the output of the slew rate adjusting circuit; and a variable series termination impedance.

18. The flexible interface as recited in claim 6 wherein one or more of the receivers include a selectable termination impedance.

19. The flexible interface as recited in claim 18 wherein the selectable termination impedance terminates the first input and second input to each other.

20. The flexible interface as recited in claim 18 wherein the selectable termination impedance terminates the receiver input to an adjustable DC reference voltage.

21. A flexible interface for use in testing different digital busses, comprising:

a first node, second node, third node and fourth node all adapted for communicating with a device under test;

a first single-ended receiver having a first input coupled to the first node and adapted to compare the first input to one or more programmable thresholds;

a second single-ended receiver having a second input coupled to the second node and adapted to compare the second input to one or more programmable thresholds; and a differential receiver adapted to produce a differential signal from the first input and the second input and compare the differential signal to one or more programmable thresholds;

a first transmitter having an output selectively coupled to either the third node or the first node and adapted to drive the first node to at least two programmable drive levels;

a second transmitter having an output selectively coupled to either the fourth node or the second node and adapted to drive the second node to at least two programmable drive levels.

22. The flexible interface as recited in claim 21 wherein the first transmitter and the second transmitter are tri-statable.

23. The flexible interface as recited in claim 21 further comprising:

a first switch operatively coupled to the first transmitter to selectively couple the output to the third node or the first node; and a second switch operatively coupled to the second transmitter to selectively couple the output to the fourth node or the second node.

* * * * *